(12) United States Patent
Suzuki et al.

(10) Patent No.: US 8,675,136 B2
(45) Date of Patent: Mar. 18, 2014

(54) IMAGE DISPLAY APPARATUS AND DETECTION METHOD

(75) Inventors: Kazuyoshi Suzuki, Tokyo (JP); Shiro Omori, Kanagawa (JP)

(73) Assignee: Sony Corporation (JP)

( * ) Notice: Subject to any disclaimer, the term of this patent is extended or adjusted under 35 U.S.C. 154(b) by 709 days.

(21) Appl. No.: 12/584,851

(22) Filed: Sep. 11, 2009

(65) Prior Publication Data

US 2010/0066855 A1    Mar. 18, 2010

(30) Foreign Application Priority Data

Sep. 12, 2008 (JP) ................. 2008-234508

(51) Int. Cl.
*H04N 9/76* (2006.01)
*H04N 5/44* (2011.01)
*G06F 3/033* (2013.01)
*G09G 5/08* (2006.01)

(52) U.S. Cl.
USPC ............ 348/601; 348/553; 345/157; 345/158

(58) Field of Classification Search
USPC .................................. 348/553, 601
See application file for complete search history.

(56) References Cited

U.S. PATENT DOCUMENTS

| 5,448,261 | A | * | 9/1995 | Koike et al. ............. | 345/158 |
| 7,379,078 | B1 | * | 5/2008 | Gossweiler et al. ........ | 345/660 |
| 7,379,568 | B2 | | 5/2008 | Movellan et al. | |
| 2001/0042247 | A1 | * | 11/2001 | Inoue ............... | 725/1 |
| 2003/0128187 | A1 | * | 7/2003 | Strubbe ............. | 345/157 |
| 2007/0047775 | A1 | | 3/2007 | Okubo | |
| 2007/0080940 | A1 | | 4/2007 | Aoki et al. | |
| 2008/0235165 | A1 | | 9/2008 | Movellan et al. | |
| 2008/0247598 | A1 | | 10/2008 | Movellan et al. | |

FOREIGN PATENT DOCUMENTS

| JP | 03-181295 | * | 7/1991 |
| JP | 2001-128253 | * | 11/2001 |
| JP | 2005-044330 | A | 2/2005 |
| JP | 2007-065766 | A | 3/2007 |
| JP | 2007-104567 | A | 4/2007 |
| JP | 2007096890 | A | 4/2007 |
| JP | 2007088835 | * | 5/2007 |
| WO | 20070013652 | A1 | 2/2007 |

OTHER PUBLICATIONS

Office Action from Japanese Application No. 2008-234508, dated Nov. 9, 2010.

(Continued)

*Primary Examiner* — Jefferey Harold
*Assistant Examiner* — Michael Teitelbaum
(74) *Attorney, Agent, or Firm* — Lerner, David, Littenberg, Krumholz & Mentlik, LLP (57) ABSTRACT

An image display apparatus is provided which includes an image display unit for displaying a still image or a moving image, an imaging unit for capturing an image in a direction in which the image display unit is displaying the still image or the moving image, a detecting unit for detecting a light emitting unit of a remote controlling device included in the image captured by the imaging unit, and detecting a movement amount of the light emitting unit within the captured image, the remote controlling device controlled by a user, and a control unit for controlling a movement amount of a pointer displayed on the image display unit, depending on the movement amount of the light emitting unit detected by the detecting unit.

10 Claims, 8 Drawing Sheets

(56) References Cited

OTHER PUBLICATIONS

Office Action from Japanese Application No. 2008-234508, dated Aug. 3, 2010.

T. F. Cootes, G. J. Edwards, and C. J. Taylor, "Active Appearance Models", Proc. Fifth European Conf. Computer Vision, H. Burkhardt and B. Neumann, eds., vol. 2, 16 pages.

* cited by examiner

IMAGE DISPLAY APPARATUS AND DETECTION METHOD

CROSS-REFERENCE TO RELATED APPLICATION

The present application claims priority from Japanese Patent Application No. JP 2008-234508 filed in the Japanese Patent Office on Sep. 12, 2008, the entire content of which is incorporated herein by reference

BACKGROUND OF THE INVENTION

1. Field of the Invention

The present invention relates to an image display and a detection method.

2. Description of the Related Art

Typically, a TV set merely generates image signals from airwaves received by an antenna to display images on the screen, whilst recently, TV sets capable of connecting to the Internet or the other networks have been developed and started to become popular. Such TV sets can connect to the Internet to display information via web browser, and in this case, it is convenience to use a pointing device which can indicate a given point on the screen, as a mouse for use along with a personal computer.

For such a pointing device, a remote controller with a so-called "free cursor function" is proposed. This "free cursor function" enables to indicate a given point on the screen by moving the remote controller. The remote controller with the free cursor function can be picked up and moved or waved round to indicate a given point on the screen or switch pages.

Also, as the functions and performances of TV sets and recording/reproducing devices get more advanced, the functions which can be controlled by a remote controller for remote controlling the TV sets and the recording/reproducing devices are increasing. Moreover, a remote controller with a display unit, such as a liquid-crystal display, has been developed recently. The display unit of this remote controller may display buttons that can be configured to run not only the basic functions, such as selecting the channels and adjusting the volume, but also the functions of programmed recording and showing of a particular programme. The user may control the TV set by touching the display unit.

If the remote controller with the display unit provides the same button on the display unit for an inexperienced user in handling as one for an experienced user, the inexperienced user is unable to utilise the remote controller well. It is thus desirable for such a controller to have a function for customising for each user the matters to be displayed on the display unit and allowing switching the matters for display for each user.

SUMMARY OF THE INVENTION

However, in the related art, a acceleration sensor and a gyro sensor needs to be built in a remote controller in order to provide the free cursor function for the remote controller, which may result in undesirable increase of the production costs and power consumption of the remote controller.

Furthermore, in order to allow switching the matters for display of a remote controller with a display unit, such as a liquid-crystal display, there could be provided, for example, a method of preparing numbered buttons on the remote controller which are to be pressed by the user, a method of inputting an ID and an password into the remote controller, and a method of reading biological information, such as a fingerprint and the like, by the remote controller, each necessarily causing the user to operate switching by himself, thereby resulting in complicated operations.

In light of the foregoing, it is desirable to provide an image display apparatus and a detection method which are novel and improved, and which allow adding readily a function to a remote controller by imaging the remote controller and the face of a human who operates the remote controller, and by detecting and identifying, from the captured image, the location of the remote controller and the face of the human who operates the remote controller.

According to an embodiment of the present invention, there is provided an image display apparatus including an image display unit for displaying a still image or a moving image, an imaging unit for capturing an image in a direction in which the image display unit is displaying the still image or the moving image, a detecting unit for detecting a light emitting unit of a remote controlling device included in the image captured by the imaging unit, and detecting a movement amount of the light emitting unit within the captured image, the remote controlling device controlled by a user, and a control unit for controlling a movement amount of a pointer displayed on the image display unit, depending on the movement amount of the light emitting unit detected by the detecting unit.

According to such a configuration, the image display unit displays a still image or a moving image, the imaging unit captures an image in a direction in which the image display unit is displaying the still image or the moving image, the detecting unit detects a light emitting unit of a remote controlling device included in the image captured by the imaging unit, and detects a movement amount of the light emitting unit within the captured image, and the remote controlling device is controlled by a user. Then the control unit controls a movement amount of a pointer displayed on the image display unit, depending on the movement amount of the light emitting unit detected by the detecting unit. As a result, the location of the emitting unit of the remote controller included in the image captured by the imaging unit, and the movement amount of the pointer indicating a given point on the image display unit is controlled depending on the detection result, so that a function can be readily added to the remote controller.

The detecting unit may detect a face of a viewer included in the image captured by the imaging unit, and detect the light emitting unit only within an area in a predetermined distance from a location of the detected face.

The detecting unit may detect a face of a viewer included in the image captured by the imaging unit, and the controlling unit may locate the pointer at a centre of the image display unit if the detecting unit detects that the light emitting unit is located at a position in a predetermined distance from the face detected by the detecting unit.

The control unit may control an emitting period of the light emitting unit to be in integer multiples of a capturing period of the imaging unit.

The control unit may change a light intensity of the light emitting unit if the detecting unit detects the light emitting unit.

The detecting unit may detect a face of a viewer included in the image captured by the imaging unit, and the control unit may control an operation of the remote controlling device by use of a detection result from the detecting unit. In this case, the control unit may control button display of the remote controlling device by use of the detection result from the detecting unit.

The control unit may estimate, by use of a detection result of the light emitting unit detected by the detecting unit, a person who operates the remote controlling device if the detecting unit detects a plurality of the faces of the viewers.

The control unit may instruct the light emitting unit to emit light if the detecting unit detects the face of the viewer. Also, the control unit may control the movement amount of the pointer, depending to a distance between the user and the imaging unit.

According to another embodiment of the present invention, there is provided an detecting method comprising the steps of capturing an image in a direction in which the image display unit that displays a still image or a moving image is displaying the still image or the moving image, detecting a light emitting unit of a remote controlling device included in the image captured at the step of capturing, and detecting a movement amount of the light emitting unit within the captured image, the remote controlling device controlled by a user, and controlling a movement amount of a pointer displayed on the image display unit, depending on the movement amount of the light emitting unit detected at the step of detecting.

According to the embodiments of the present invention described above, it is possible to provide an image display apparatus and a detection method which are novel and improved, and which allow adding readily a function to a remote controller by imaging the remote controller and a face of a human who operates the remote controller, and by detecting and identifying, from the captured image, the location of the remote controller and the face of the human who operates the remote controller.

DETAILED DESCRIPTION OF THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
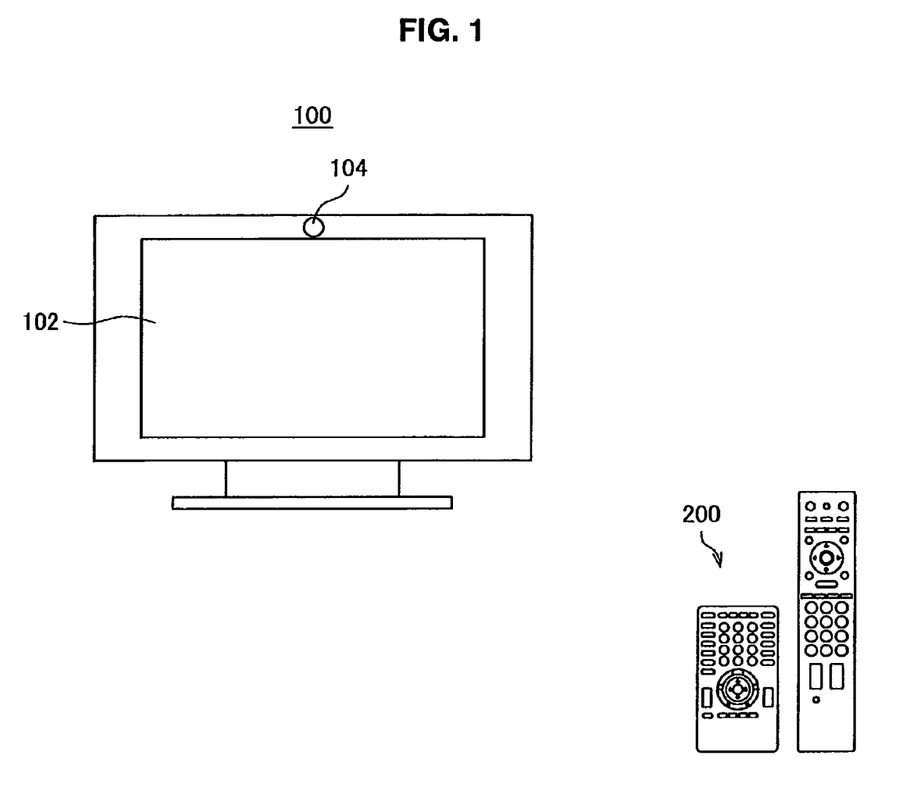
FIG. 1 is an explanatory view that illustrates the appearance of an image display apparatus 100 according to an embodiment of the present invention.

Preferred embodiments of the present invention will be then described hereinafter in the following order:
1. Overview of Image Display Apparatus According to Embodiment of Present Invention
2. Operation of Image Display Apparatus According to Embodiment of Present Invention
  2-1. Realisation of free cursor function
  2-2. Realisation of button display control of remote controller
3. Conclusion 1. OVERVIEW OF IMAGE DISPLAY APPARATUS ACCORDING TO EMBODIMENT OF PRESENT INVENTION Firstly, an overview of an image display apparatus according to an embodiment of the present invention will be described. FIG. 1 is an explanatory view that illustrates the appearance of an image display apparatus 100 according to an embodiment of the present invention. In the following, the appearance of an image display apparatus according to an embodiment of the present invention will be described by use of FIG. 1.

As shown in FIG. 1, the image display apparatus 100 according to an embodiment of the present invention includes, in the upper middle of a display panel 102 for images, an image input unit 104 for capturing a moving image. The image input unit 104 is configured to capture a moving image in the direction in which the image display apparatus 100 displays the moving image by the display panel 102. The image display apparatus 100 according this embodiment analyses the image captured by the image input unit 104 and detects a human's face in the image. The image display apparatus 100 is characterised by changing the internal operation status of the image display apparatus 100 based on whether a human's face is included in the moving image captured by the image input unit 104.

Besides, although the image display apparatus 100 in FIG. 1 includes, in the upper middle of the display panel 102 for images, the image input unit 104 for capturing a moving image, the present invention does not, of course, limit the location of an image input for capturing moving images to the above example. For example, an apparatus which is different from the image display apparatus 100 may be provided, connected to the image display apparatus 100, and may capture moving images. Also, the number of image input units is not, of course, limited to one, and more than one image input unit may be provided to capture images.

Figure 2:
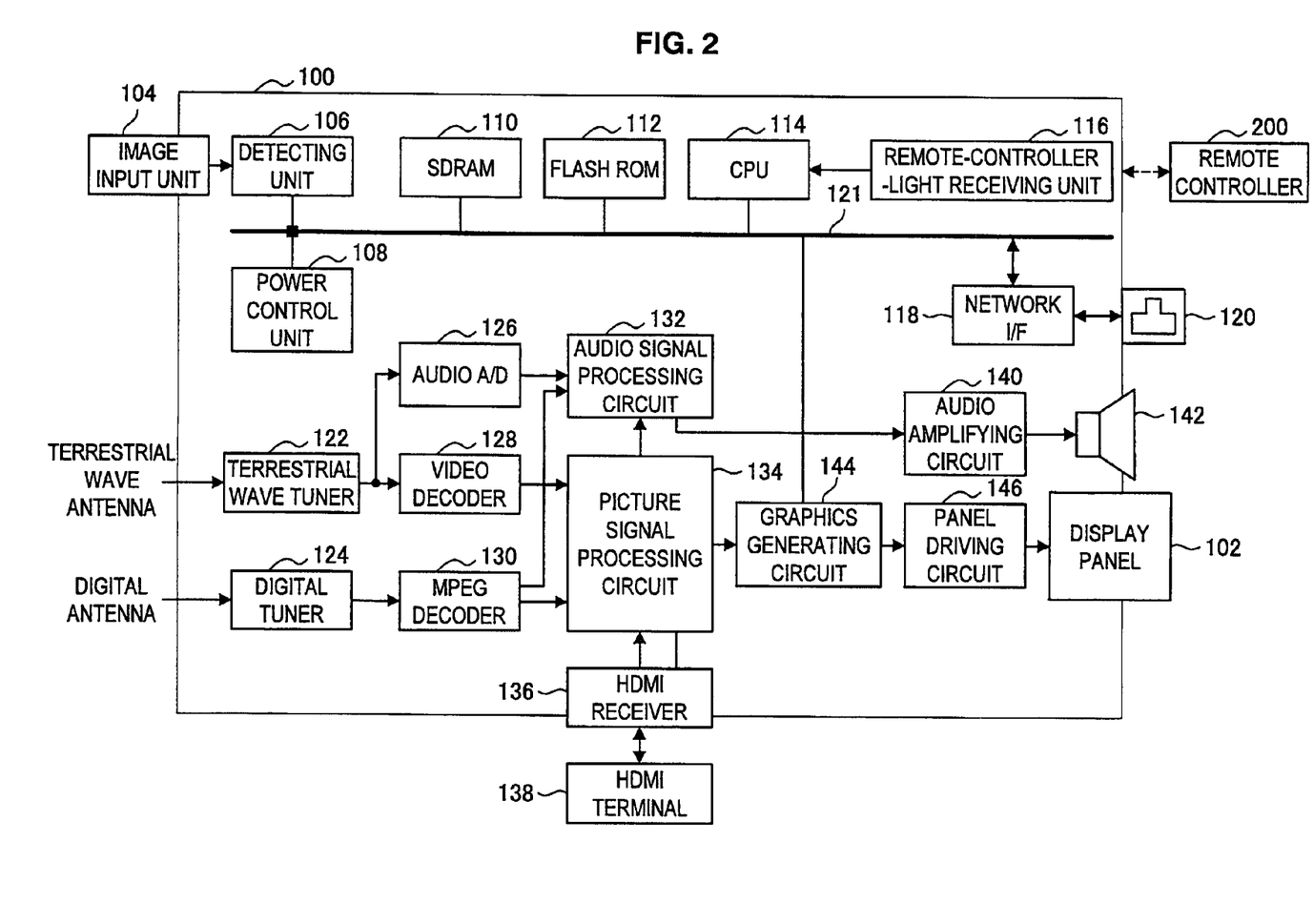
FIG. 2 is an explanatory view that shows the configuration of an image display apparatus 100 according to an embodiment of the present invention.

In the above, an overview of the image display apparatus 100 according to an embodiment of the present invention has been described. Next, the configuration of the image display apparatus 100 according to an embodiment of the present invention FIG. 2 is an explanatory view that shows the configuration of the image display apparatus 100 according to an embodiment of the present invention. In the following, the configuration of the image display apparatus 100 according to an embodiment of the present invention will be described by use of FIG. 2.

As shown in FIG. 2, an image display apparatus 100 includes a display panel 102, an image input unit 104, a detecting unit 106, a power control unit 108, a SDRAM (Synchronous Dynamic Random Access Memory) 110, a flash ROM 112, a CPU 114, a remote-controller-light receiving unit 116, a network I/F 118, a network terminal 120, a terrestrial wave tuner 122, a digital tuner 124, an audio A/D converting circuit 126, a video decoder 128, an MPEG decoder 130, an audio signal processing circuit 132, a picture signal processing circuit 134, an HDMI (High-Definition Multimedia Interface) receiver 136, an HDMI terminal 138, an audio amplifying circuit 140, a speaker 142, a graphics generating circuit 144, a panel driving circuit 146.

The terrestrial wave tuner 122 is configured to receive airwave signals transmitted from a terrestrial wave antenna (not shown) for receiving analogue terrestrial waves, and demodulate picture and audio signals included in the airwave signals into baseband signals. The audio signals of the baseband signals demodulated by the terrestrial wave tuner 122 are transmitted to the audio A/D converting circuit 126, and the picture signals of the demodulated baseband signals are transmitted to the video decoder 128.

The digital tuner 124 is configured to receive airwave signals transmitted from a digital antenna (not shown) for receiving digital airwaves, convert the received airwave signals into an MPEG2-TS (MPEG2 Transport Stream). Upon conversion of the airwave signals into the MPEG2-TS, the digital tuner 124 transmits the converted MPEG2-TS to the MPEG decoder 130.

The audio A/D converting circuit 126 is configured to receive the audio signals demodulated by the terrestrial wave tuner 122, and convert the audio signals from analogue into digital. Upon conversion of the audio signals from analogue into digital, the audio A/D converting circuit 126 transmits the converted digital audio signals to the audio signal processing circuit 132.

The video decoder 128 is configured to receive the picture signals demodulated by the terrestrial wave tuner 122, and convert the picture signals from analogue signals into digital component signals. Upon conversion of the picture signals from analogue signals into digital component signals, the video decoder 128 transmits the converted digital component signals to the picture signal processing circuit 134.

The MPEG decoder 130 is configured to receive the MPEG2-TS transmitted from the digital tuner 124, and convert the audio from the MPEG2-TS into digital signals, and the picture from the MPEG2-TS into digital component signals. Upon conversion from the MPEG2-TS into digital audio signals and digital component signals, the MPEG decoder 130 transmits the converted digital audio signals to the audio signal processing circuit 132, and the converted digital component signals to the picture signal processing circuit 134.

The audio signal processing circuit 132 is configured to receive the digital audio signals transmitted from the audio A/D converting circuit 126 and MPEG decoder 130, and execute signal processing on the digital audio signals. Upon signal processing on the digital audio signals by the audio signal processing circuit 132, the audio signals are transmitted to the audio amplifying circuit 140.

The picture signal processing circuit 134 is configured to receive the digital component signals transmitted from the video decoder 128 and the MPEG decoder 130, and execute signal processing on the digital component signals. Upon signal processing on the digital component signals by the picture signal processing circuit 134, the digital component signals are transmitted to the audio amplifying circuit 140.

The HDMI receiver 136 is configured to receive digital baseband signals input from the HDMI terminal 138 that is one of the external input terminals. The digital baseband signals received by the HDMI receiver 136 are transmitted to the audio signal processing circuit 132 and the picture signal processing circuit 134, and signal processing is executed on audio signals and on digital component signals, respectively.

The audio amplifying circuit 140 is configured to receive the audio signals output from the audio signal processing circuit 132, amplify them by a predetermined amplification amount, and output the amplified signals. The amount of the amplification by the audio amplifying circuit 140 depends on the volume specified by the user of the image display apparatus 100. The audio signals amplified by the audio amplifying circuit 140 are transmitted to the speaker 142. The speaker 142 outputs a sound based on the audio signals transmitted from the audio amplifying circuit 140.

The graphics generating circuit 144 is configured to generate graphic pictures that are necessary for the operation of the image display apparatus 100. Different pictures are generated as the graphic pictures that are necessary for the operation of the image display apparatus 100, according to the operation by the user. The graphic pictures generated by the graphics generation circuit 144 are transmitted to the panel driving circuit 146, multiplexed with or replaced by the picture signals transmitted from the picture signal processing circuit 134. Besides, if the graphic pictures are not generated, the picture signals transmitted from the picture signal processing circuit 134 may be passed directly to the panel driving circuit 146.

The panel driving circuit 146 is configured to generate, from the picture signals transmitted from the graphics generating circuit, panel driving signals that is necessary for displaying pictures on the display panel 102. The panel driving signals generated by the panel driving circuit 146 are transmitted to the display panel 102. The display panel 102 operates depending on the panel driving signals, and pictures are then displayed on the display panel 102.

The display panel 102 is configured to display moving images based on the panel driving signals transmitted from the panel driving circuit 146. In this embodiment, the display panel 102 display moving images by liquid crystals.

As described above, the image input unit 104 is provided in the upper middle of the display panel 102 for images, and configured to capture a moving image in the direction in which the image display apparatus 100 displays the moving image by the display panel 102, when the panel driving signals are supplied to the display panel 102 and the moving image is displayed on the display panel 102. The image input unit 104 may be configured to capture a moving image by a CCD (Charge Coupled Device) or CMOS (Complementary Metal Oxide Semiconductor) image sensor. The moving image captured by the image input unit 104 is transmitted to the detecting unit 106. Besides, the number of the image input unit 104 may be one or more.

The detecting unit 106 is configured to get the moving images, which are transmitted from the image input unit 104, input thereto, and detect a human's face included in the moving images and the location of the light-emitting unit of the remote controller 200. The detected results from the detecting unit 106 of a human's face in the moving images and the location of the light-emitting unit of the remote controller 200 are transmitted to the power control unit 108, the CPU 114 and the like, and used for controlling the operation of the image display apparatus 100. Besides, the configuration of the detecting unit 106 will be described in detail below.

The power control unit 108 is configured to control the power consumption of the image display apparatus 100 by controlling the operation of each part of the image display apparatus 100. The operation of the power control unit 108 will be described in detail below, though for now is explained with one example: when the detection by the detecting unit 106 results in no human's face found in a moving image that is transmitted from the image input unit 104, the power control unit 108 determines that nobody is watching the moving image displayed on the display panel 102 of the image display apparatus 100, and gets control to lower the brightness of the backlight of the display panel 102.

Thus, depending on the situation of viewing moving images displayed by the image display apparatus 100, the power consumption of the image display apparatus 100 can be controlled by controlling the operation of each part of the image display apparatus 100 by the power control unit 108 depending on the detected results from the detecting unit 106.

The SDRAM 110 is a temporary work area for a computer program under execution for controlling each part of the image display apparatus 100 by the CPU 114. The flash ROM 112 is a ROM in which the computer program for controlling each part of the image display apparatus 100 by the CPU 114 is stored. And the CPU 114 is configured to read and execute sequentially the computer program, which is stored in the flash ROM 112, for controlling each part of the image display apparatus 100.

The remote-controller-light receiving unit 116 is configured to receive signals transmitted from the remote controller 200. The signals received by the remote-controller-light receiving unit 116 are input into the CPU 114, by which the control codes included in the signals are decoded. Upon decoding the control codes, the CPU 114 controls each part of the image display apparatus 100 to operate in response to the control codes (adjusting the volume, setting channels, displaying a menu picture, etc.).

The network I/F 118 is configured to receive signals input from the network terminal 120 via a network, and transmit signals to the network via the network terminal 120. Upon receiving the signals input from the network terminal 120 via the network, the network I/F 118 transmits the received signals to the CPU 114. The CPU 114 analyses the signals received by network I/F 118, controls each part of the image display apparatus 100 to operate in response to the signals.

Besides, each part of the image display apparatus 100 are connected by an internal bus 121, and configured to allow control of each part of the image display apparatus 100 by the CPU 114. Also, the image display apparatus 100 and the remote controller 200 may be in wireless communication with each other. Thus, not shown in FIG. 2, a wireless communication unit for wireless communication may be included in the image display apparatus 100 and the remote controller 200.

In the above, the configuration of the image display apparatus 100 according to an embodiment of the present invention has been described. Next, the configuration of the detecting unit 106 included in the image display apparatus 100 according to an embodiment of the present invention will be described.

Figure 3:
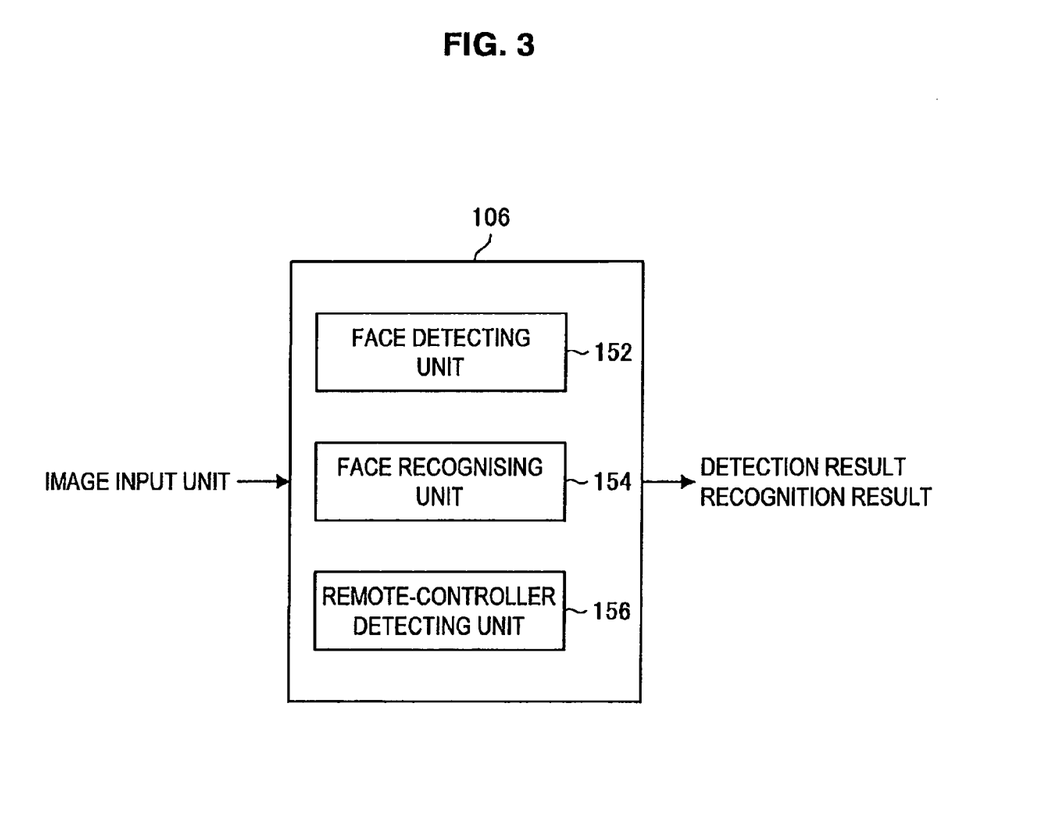
FIG. 3 is an explanatory view that illustrates the configuration of a detecting unit 106 included in an image display apparatus 100 according to an embodiment of the present invention.

FIG. 3 is an explanatory view that illustrates the configuration of the detecting unit 106 included in the image display apparatus 100 according to an embodiment of the present invention. In the following, the configuration of the detecting unit 106 included in the image display apparatus 100 according to an embodiment of the present invention will be described by use of FIG. 3.

As shown in FIG. 3, the detecting unit that is included in the image display unit 100 according to an embodiment of the present invention includes a face detecting unit 152, a face recognising unit 154, and a remote-controller detecting unit 156.

The face detecting unit 152 is configured to execute a process (a face detecting process) for detecting part of a human's face out from an image captured by the image input unit 104 and transmitted from the image input unit 104. By detecting part of a human's face by the face detecting unit 152, a control related to the human's face can be executed.

The face recognising unit 154 is configured to execute a further process (a face recognising process) for specifying a person upon the part of a human's face that is detected by the face detecting unit 152 out from the image captured by the image input unit 104 and transmitted from the image input unit 104. By executing the face recognising process for specifying a person by the face recognising unit 154, a control related to the specified person can be executed.

The remote-controller detecting unit 156 is configured to execute a remote-controller detecting process for detecting the location of the remote controller 200 out from an image captured by the image input unit 104 and transmitted from the image input unit 104. By executing the remote-controller detecting process by the remote-controller detecting unit 156, a control related to the location of the remote controller 200 can be executed.

The detecting unit 106 is thus configured, so that, out from an image captured by the image input unit 104 and transmitted from the image input unit 104, a human's face can be detected and then the face can be recognised, and also the location of the remote controller 200 can be detected. Further, using the detected results from the detecting unit 106, controls related to the human's face, to the specified person, and to the location of the remote controller 200 can be executed within the image display apparatus 100.

In the above, the configuration of a detecting unit 106 included in an image display apparatus 100 according to an embodiment of the present invention has been described by use of FIG. 3. Next, the operation of an image display apparatus 100 according to an embodiment of the present invention will be described.

2. OPERATION OF IMAGE DISPLAY APPARATUS ACCORDING TO EMBODIMENT OF PRESENT INVENTION

2-1. Realisation of Free Cursor Function

Figure 4:
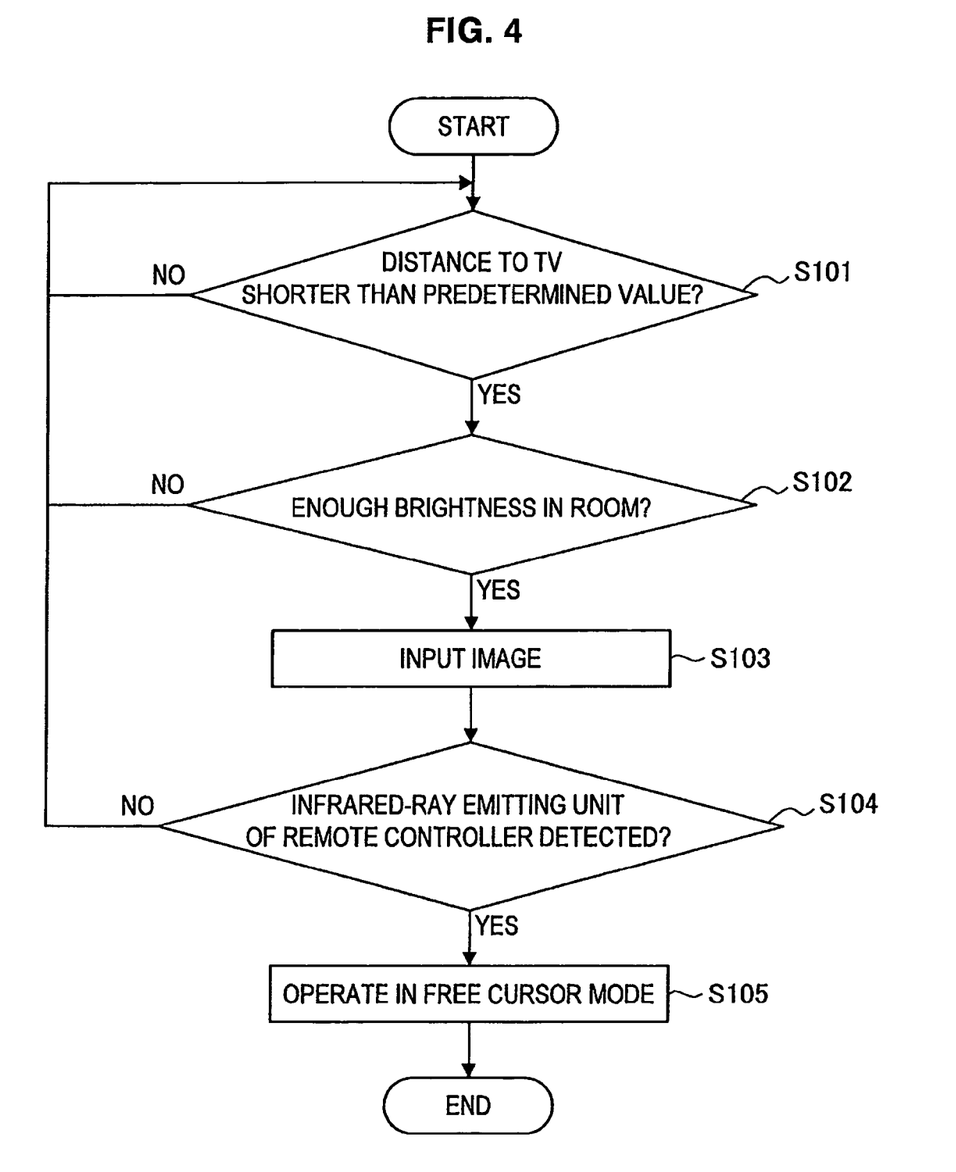
FIG. 4 is a flow diagram that illustrates the operation of an image display apparatus 100 according to an embodiment of the present invention.

FIG. 4 is a flow diagram that illustrates the operation of the image display apparatus 100 according to an embodiment of the present invention. In the following, the operation of the image display apparatus 100 according to an embodiment of the present invention will be described by use of FIG. 4.

The flow diagram shown in FIG. 4 shows an operation in a case where it is detected whether a light emitting unit of the remote controller 200 exists or not out from an image captured by the image input unit 104 and transmitted from the image input unit 104, and where it is determined whether or not to switch to the free cursor mode, depending on the existence of the light emitting unit of the remote controller 200.

Upon capturing a moving image by the image input unit 104, the moving image captured by the image input unit 104 is analysed by the face detecting unit 106, and the distance between the image display apparatus 100 and a viewer is measured from the area taken by the face of the viewer out of the moving image captured by the image input unit 104. Then, as a result of the measurement, it is determined by the face detecting unit 152 whether the measured distance is shorter than a predetermined distance (step S101). Besides, the distance between the image display apparatus 100 and the viewer may not be precisely measured, but be measured in a rough range (for example, the location of the face exists at a distance of 2 m50 cm-3 m from the image input unit 104).

If as a result of the determination of the face detecting unit 152 at step S101, the measured distance is shorter than the predetermined distance, any control related to the free cursor mode will not be taken, the operation then returns to step S101, and the determining process by the face detecting unit 152 is repeated. On the other hand, as a result of the determination of the face detecting unit 152 at step S101, if the measured distance is longer than the predetermined distance, then subsequently, it is detected whether the brightness in the room where the image display apparatus 100 is located reaches a predetermined brightness (step S102). It may be determined whether the brightness in the room reaches the predetermined brightness, for example, as follows: given that the image input unit 104 is configured with a CCD image sensor, an average for the image is obtained by the CCD image sensor. Then, it is determined by the CPU 114 whether the obtained average for the image is equal to or above a predetermined value.

In this embodiment, if, as a result of the above-mentioned detection of the brightness in the room at step S102, it is determined that the brightness in the room where the image display apparatus 100 is located does not reach the predetermined brightness, then a switch to the free cursor mode will not be done. Of course, the present invention is not limited to the above example, and a switching process to the free cursor mode may be done even if the brightness in the room where the image display apparatus 100 is located does not reach the predetermined brightness. Also in the present invention, the above-mentioned distance detecting process at step S101 and the above-mentioned process for detecting the brightness in the room at step S102 themselves may be omitted.

Upon the process for detecting whether the brightness in the room reaches the predetermined brightness at step S102, the image is subsequently input from the image input unit 104 into the detecting unit 106 (step S103), a remote-controller detecting process is executed by the remote-controller detecting unit 156 that is included in the detecting unit 106. The remote-controller detecting process in this embodiment is a process for detecting, from the image supplied by the image input unit 104, the location of a infrared-ray emitting unit of the remote controller 200 operated by the user of the image display apparatus 100. The image input unit 104 in this embodiment can image as a bright point the infrared-ray emitting unit of the remote controller 200, which is invisible for humans. Then, the remote-controller detecting unit 156 detects the location of the infrared-ray emitting unit of the remote controller 200 imaged by the image input unit 104, and also the trajectory of the movement of the infrared-ray emitting unit of the remote controller 200 is tracked, so that the image display apparatus 100 can switch to the free cursor mode.

As a result of the remote-controller detecting process by the remote-controller detecting unit 156, it is determined whether the remote-controller detecting unit 156 has successfully detected the location of the infrared-ray emitting unit of the remote controller 200 (step S104). If, as a result of the detection at step S104, the remote-controller detecting unit 156 has unsuccessfully detected the location of the infrared-ray emitting unit of the remote controller 200, the operation returns to step S101, the determining process by the face detecting unit 152 is repeated. On the other hand, if, as a result of the measurement at step S104, the remote-controller detecting unit 156 has successfully detected the location of the infrared-ray emitting unit of the remote controller 200, the image display apparatus 100 is controlled to operate in the free cursor mode. For example, the CPU 114 may control the image display apparatus 100 to operate in the free cursor mode.

When the image display apparatus is switched into the free cursor mode, the location of the infrared-ray emitting unit of the remote controller 200 at given timing of reading is detected based on the image captured by the image input unit 104. Then, the location of the infrared-ray emitting unit of the remote controller 200 at another timing of reading, so that the movement of the location of the infrared-ray emitting unit of the remote controller 200 can be figured out based on the difference in the locations of the infrared-ray emitting unit of the remote controller 200. Moving a cursor displayed on the display panel 102 based on this movement amount of the location of the infrared-ray emitting unit enables a two-dimensional pointing, as in a mouse for use along with a personal computer (PC).

Figure 5:
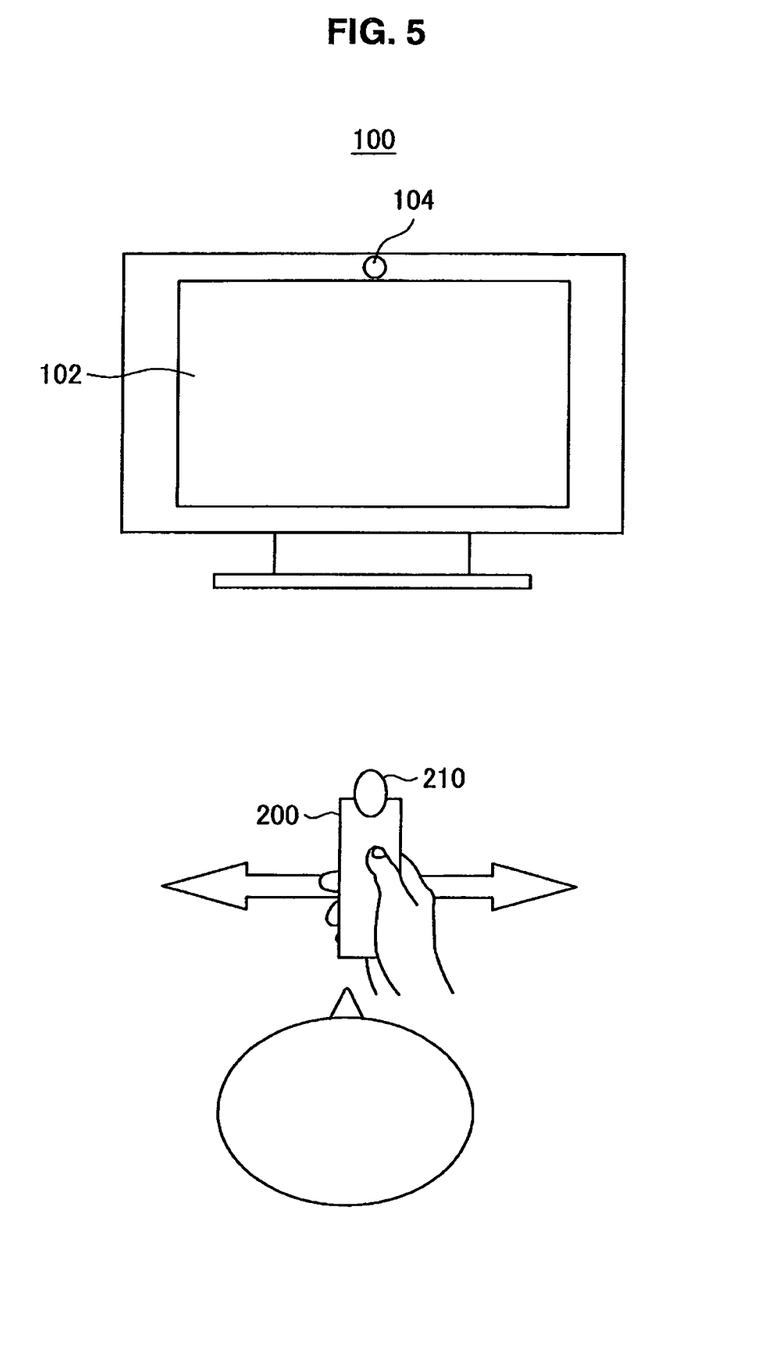
FIG. 5 is an explanatory view that illustrates a free cursor mode.

FIG. 5 is an explanatory view that illustrates a case where the image display apparatus 100 is switched into a free cursor mode, and where a cursor displayed on the display panel 102 is moved by moving the remote controller 200 in hand. In FIG. 5, the image input unit 104 images the infrared-ray unit 210 of the remote controller 200 in the user's hand, and the location of the infrared-ray emitting unit 210 included in the image captured by the image input unit 104 is detected by the remote-controller detecting unit 156, so that the free cursor function is realised. Furthermore, the cursor (not shown) displayed on the display panel 102 can be also moved depending on the movement of the remote controller 200, by moving the remote controller 200 in the user's hand in various directions.

The movement amount of a cursor (not shown) displayed on the display panel 102, given when the user moves the remote controller 200 in hand, may be changed, for example, depending on the distance between the user and the image input unit 104. For example, the movement amount of the cursor given when the user moves the remote controller 200 in hand becomes smaller the longer the distance between the user and the image input unit 104 becomes. Also, the distance of the cursor displayed on the display panel 102 may be allowed to change arbitrarily according to the user's settings.

Besides, a result of the face detection from the face detecting process by the face detecting unit 152 may be used when the image display apparatus 100 is operated in the free cursor mode. For example, when a face detecting process is done by the face detecting unit 152 to specify the area of the face, a filtering may be performed to detect the infrared-ray emitting unit 210 of the remote controller 200 only within a predetermined area in the right, left, and downwards directions from the specified face. For example, when a face detecting process is done by the face detecting unit 152 to specify the area of the face, a filtering may be performed to detect the infrared-ray emitting unit 210 of the remote controller 200 only within an area of 50 cm each in the right, left, and downwards direction from the specified face. Because of such a filtering, the remote-controller detecting process are not necessarily to be executed for the whole area within the image captured by the image input unit 104, which can allow a certain realisation of the free cursor function with lighter processing.

Using a result of the face detection from the face detecting process by the face detecting unit 152, the initial position (home position) of a cursor and the centre position for the cursor are set for the case where the image display apparatus 100 is operated in the free cursor mode. For example, the cursor may be set to point at the centre of the display panel 102 when the infrared-ray emitting unit 210 of the remote controller 200 is located at 30 cm below the user's face and 20 cm right to the user's face. With such a setting, the free cursor function by use of the remote controller 200 can be realised almost with satisfaction of the user's natural sense.

Furthermore, in order to detect more certainly the infrared-ray emitting unit 210 of the remote controller 200, infrared-ray emitting patterns of the infrared-ray emitting unit 210 may be configured to emit in different patterns from those for normal command transmissions of the remote controller. In that case, the infrared-ray may be configured to wink in an emitting pattern that matches timing for reading of the image input unit 104 (for example, at a rate of timing in integer multiples of the frame rate for image capturing by the image input unit 104). Thus by controlling the emitting patterns, if, for example, the rate for image capturing by the image input unit 104 is 30 times per second, the infrared-ray emitting unit 210 of the remote controller 200 is then configured to wink at 15 Hz, so that the infrared-ray emitting unit 210 of the remote controller 200 can be certainly extracted by deriving a difference to the last captured image, even if the noise components of the images obtained by the image input unit 104 are large. Moreover, the intensity of the emitted light in this case is desirably set larger than those for command transmissions of the remote controller, or set adaptively depending on a degree of recognising winks. Such setting of the intensity of the emitted light allows both certain locating of the position of the light source and realising of a smaller power consumption.

Besides, timing of switching into the free cursor mode may be timing explicitly instructed by the user of the image input apparatus 100, or timing at which the image display apparatus 100 has started to communicate with an external network, such as the Internet etc., and at which, for example, a website on the Internet is displayed on the display panel 102.

2-2. Realisation of Button Display Control of Remote Controller

Figure 6:
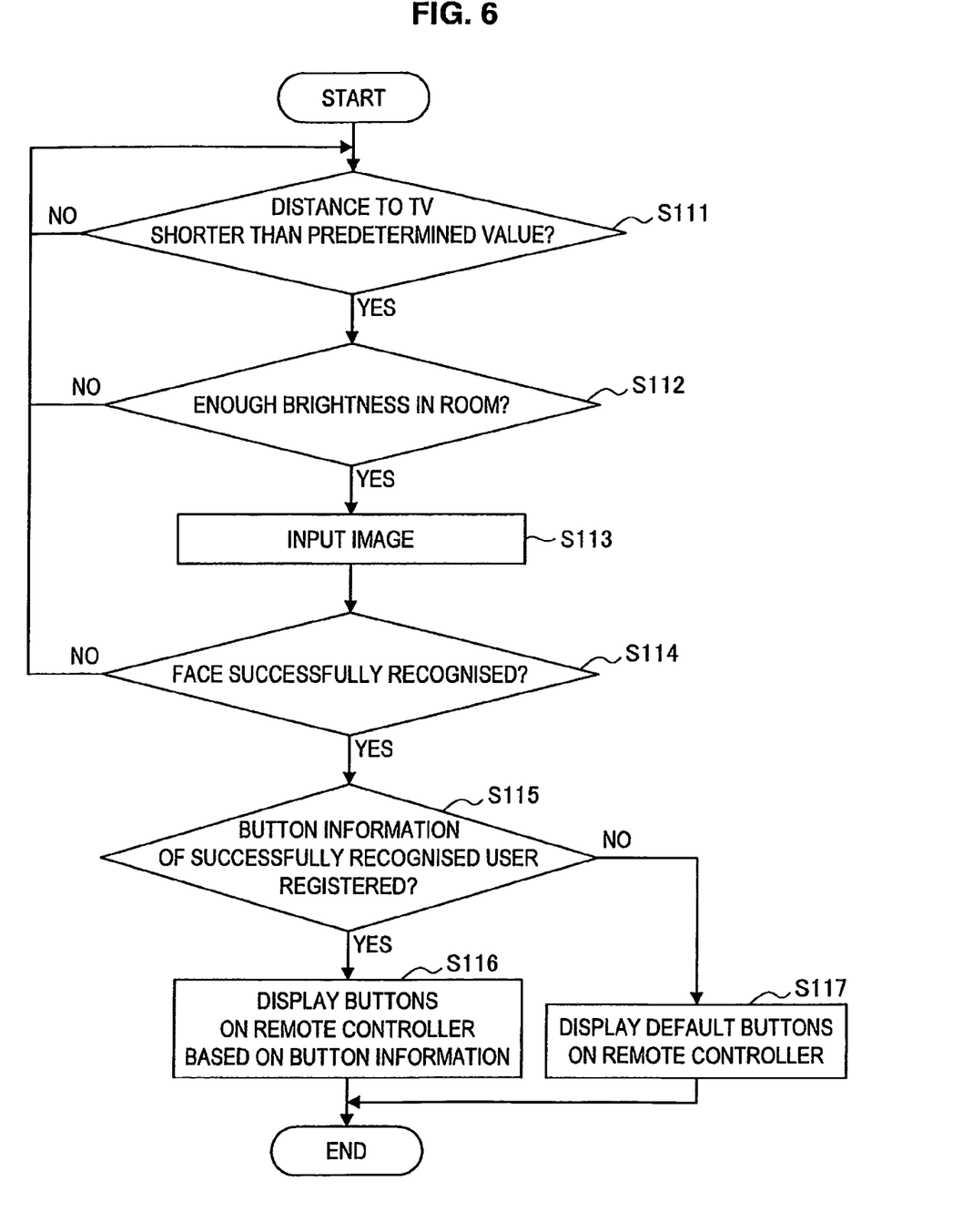
FIG. 6 is a flow diagram that illustrates the operation of an image display apparatus 100 according to an embodiment of the present invention.

FIG. 6 is a flow diagram that illustrates the operation of the image display apparatus 100 according to an embodiment of the present invention. In the following, the operation of the image display apparatus 100 according to an embodiment of the present invention will be described by use of FIG. 6.

The flow diagram shown in FIG. 6 shows a case where the image input unit 104 images, the face of the user who controls the remote controller 200 is then detected and recognised from the image transmitted from the image input unit 104, and a user interface corresponding to the recognised user is displayed at the remote controller 200.

Upon capturing a moving image by the image input unit 104, the moving image captured by the image input unit 104 is analysed by the face detecting unit 106, and the distance between the image display apparatus 100 and a human is measured from the area taken by the face of the human out of the moving image captured by the image input unit 104. Then, as a result of the measurement, it is determined by the face detecting unit 152 whether the measured distance is shorter than a predetermined distance (step S111). Besides, the distance between the image display apparatus 100 and the human may not be precisely measured, but be measured in a rough range (for example, the location of the face exists at a distance of 2 m50 cm-3 m from the image input unit 104).

If, as a result of the determination of the face detecting unit 152 at step S111, the measured distance is shorter than the predetermined distance, any control related to the free cursor mode will not be taken, the operation returns to step S111, and the determining process by the face detecting unit 152 is repeated. On the other hand, as a result of the determination of the face detecting unit 152 at step S111, if the measured distance is longer than the predetermined distance, then subsequently, it is detected whether the brightness in the room where the image display apparatus 100 is located reaches a predetermined brightness (step S112). It may be determined whether the brightness in the room reaches the predetermined brightness, for example, as follows: given that the image input unit 104 is configured with a CCD image sensor, an average for the image is obtained by the CCD image sensor. Then, it is determined by the CPU 114 whether the obtained average for the image is equal to or above a predetermined value.

In this embodiment, if, as a result of the above-mentioned detection of the brightness in the room at step S112, it is determined that the brightness in the room where the image display apparatus 100 is located does not reach the predetermined brightness, then no control over the user interface for the remote controller 200 will be done. Of course, the present invention is not limited to the above example, and a control over the user interface for the remote controller 200 may be done even if the brightness in the room where the image display apparatus 100 is located does not reach the predetermined brightness. Also in the present invention, the above-mentioned distance detecting process at step S111 and the above-mentioned process for detecting the brightness in the room at step S112 themselves may be omitted.

Upon the process for detecting whether the brightness in the room reaches the predetermined brightness at step S112, the image is subsequently input from the image input unit 104 into the detecting unit 106 (step S103), a face detecting process is executed by the face detecting unit 152 that is included in the detecting unit 106, then a process for recognising the user's face is executed by the face recognising unit 154, using the image of face obtained as a result of the face detection process.

For example, the techniques described in JP 2007065766 (A) and JP 2005044330 (A) can be used in the face detecting process by the face detecting unit 152 and in the face recognising process by the face recognising unit 154. In the following, the face detecting process will be described briefly.

In order to detect a human's face from an image, firstly, the location of a face in a supplied image, the size of the face, and the direction of the face are detected respectively. By detecting the location and size of the face, a face image, which is part of the image, can be clipped from the image. Characteristic parts of the face (face characteristics locations), such as characteristic parts like eyebrows, eyes, a nose, and a mouse, are detected based on the clipped face image and information of the direction of the face. For the detection of the face characteristics location, characteristic locations can be detected by applying a method that is called AAM (Active Appearance Models), for example. AAM is described in T. F. Cootes, G. J. Edwards, and C. J. Taylor, "Active Appearance Models," Proc. Fifth European Conf. Computer Vision, H. Burkhardt and B. Neumann, eds, vol. 2, pp. 484-498, 1998.

Upon detecting the face characteristic locations, a local characteristic quantity is calculated for each of the detected face characteristic locations. Calculating the local characteristic quantities and keeping the calculated local characteristic quantities stored along with the face image allow identification of a face from an image input by the image input unit 104. For the method of detecting a face, the techniques described in JP 2007065766 (A) and JP 2005044330 (A) can be used, for example, and therefore the details are not explained here. Also, according to a face image and face characteristic locations, it is possible to determine from a human's face in a supplied image that the human is male or female and adult or child. Moreover, it is possible to specify a person from an image input by the image input unit 104 by keeping information of face characteristics locations and local characteristic quantities stored, and verifying, with the stored information, a result of the face detecting and recognising processes on the image input by the image input unit 104.

As a result of inputting the image from the image input unit 104 to the detecting unit 106 at above-mentioned step S113, and performing the face detecting and recognising processes by the face detecting unit 152 and the face recognising unit 154, respectively, it is then determined whether the human's face has been detected and recognised successfully or unsuccessfully (step S114). If, as a result of the determination at step S114, no human's face has been successfully detected or the user has unsuccessfully recognised, the operation returns to step S111, and the determining process by the face detecting unit 152 is repeated. On the other hand, if, as a result of the determination at step S114, a human's face has been successfully detected and the user has been successfully recognised, it is determined whether the button information of the remote controller 200 for the successfully recognised user is registered in the image display apparatus 100 (step S115).

If, as a result of the determination at above-mentioned step S115, the button information of the remote controller 200 for the successfully recognised user is registered in the image display apparatus 100, buttons are displayed on the remote controller 200 based on the registered button information (step S116). For example, in order to display buttons on the remote controller 200, a radio signal including the button information may be transmitted to the remote controller 200, and the radio signal may be analysed by the remote controller 200.

Here, an example of the way of registering button information of the remote controller 200 into the image display apparatus 100 is described. For example, in order to register button information of the remote controller 200 into the image display apparatus 100, the image input unit 104 is caused to start capturing an image by manipulating with buttons of the remote controller 200. A user who wants to register button information of the remote controller 200 moves the user's face into the area that the image input unit 104 can image, and has it captured by the image input unit 104, and additionally, transmit from the remote controller 200 the button information that the user wants to register. In the image display apparatus 100, the face recognising process is performed by the face recognising unit 154 on the image captured by the image input unit 104, and a result of the face recognising process and the button information transmitted from the remote controller 200 are correlated and stored in the internal of the image display apparatus 100 (e.g., the flash ROM 112). By thus registering the button information of the remote controller 200 into the image display apparatus 100, button information for each user can be obtained in correspondence to a result of imaging by the image input unit 104. Besides, registering button information into the image display apparatus 100 in the present invention is not, of course, limited to the above example, and button information may be stored in the image display apparatus 100, for example, by displaying information, such as "ADVANCED" and "SIMPLE," on the remote controller 200 and the display panel, and selecting either "ADVANCED" or "SIMPLE."

On the other hand, if, as a result of the determination at above-mentioned step S115, the button information of the remote controller 200 for the successfully recognised user is not registered in the image display apparatus 100, default buttons pre-registered in the remote controller 200 are displayed on the remote controller 200 (step S117). For example, in order to display pre-registered default buttons on the remote controller 200, a radio signal including button information may be transmitted to the remote controller 200, and the radio signal may be analysed by the remote controller 200.

Figure 7:
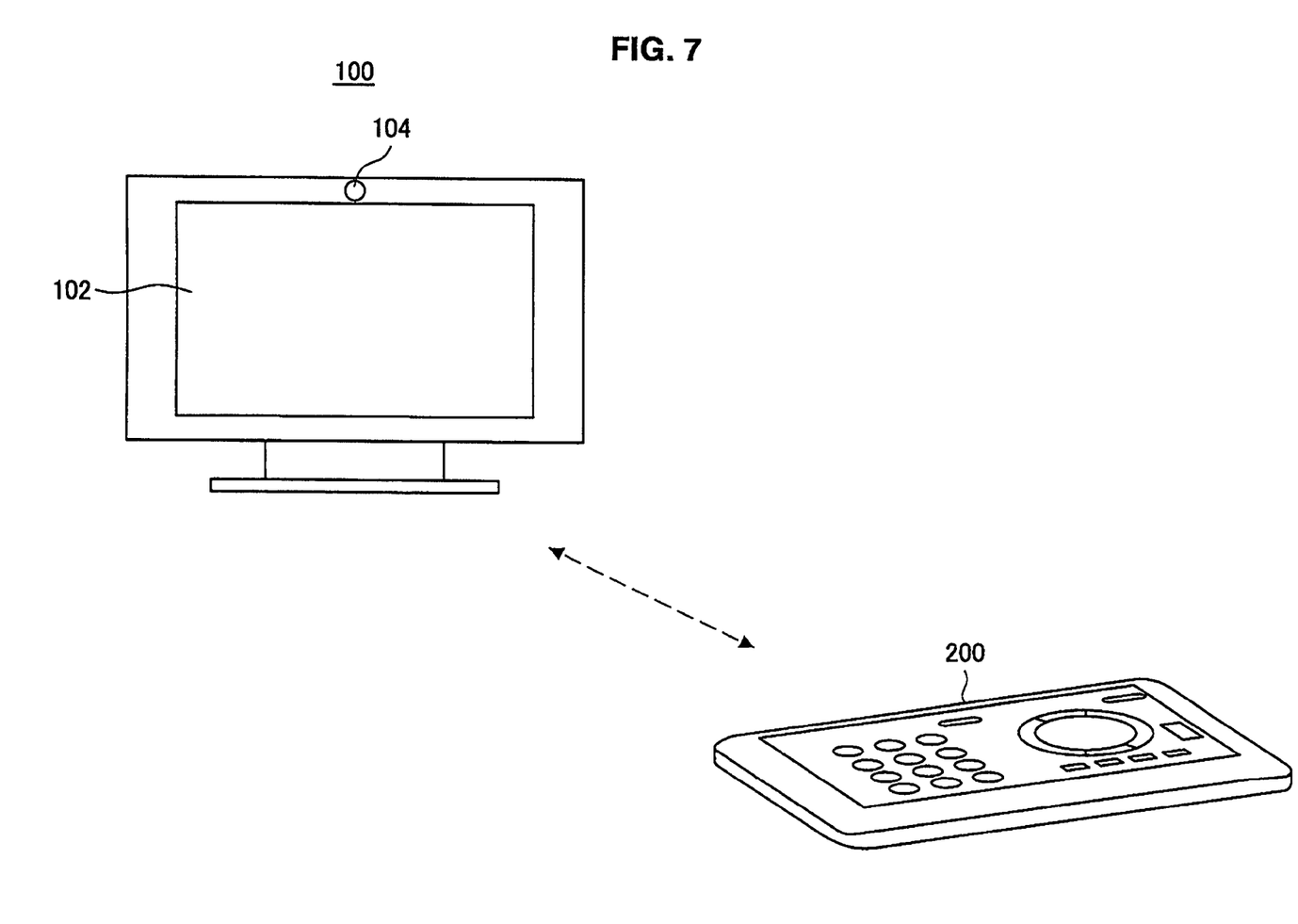
FIG. 7 is an explanatory view that shows a case where buttons displayed by a remote controller 200 are changed in correspondence to a recognised user.
Figure 8:
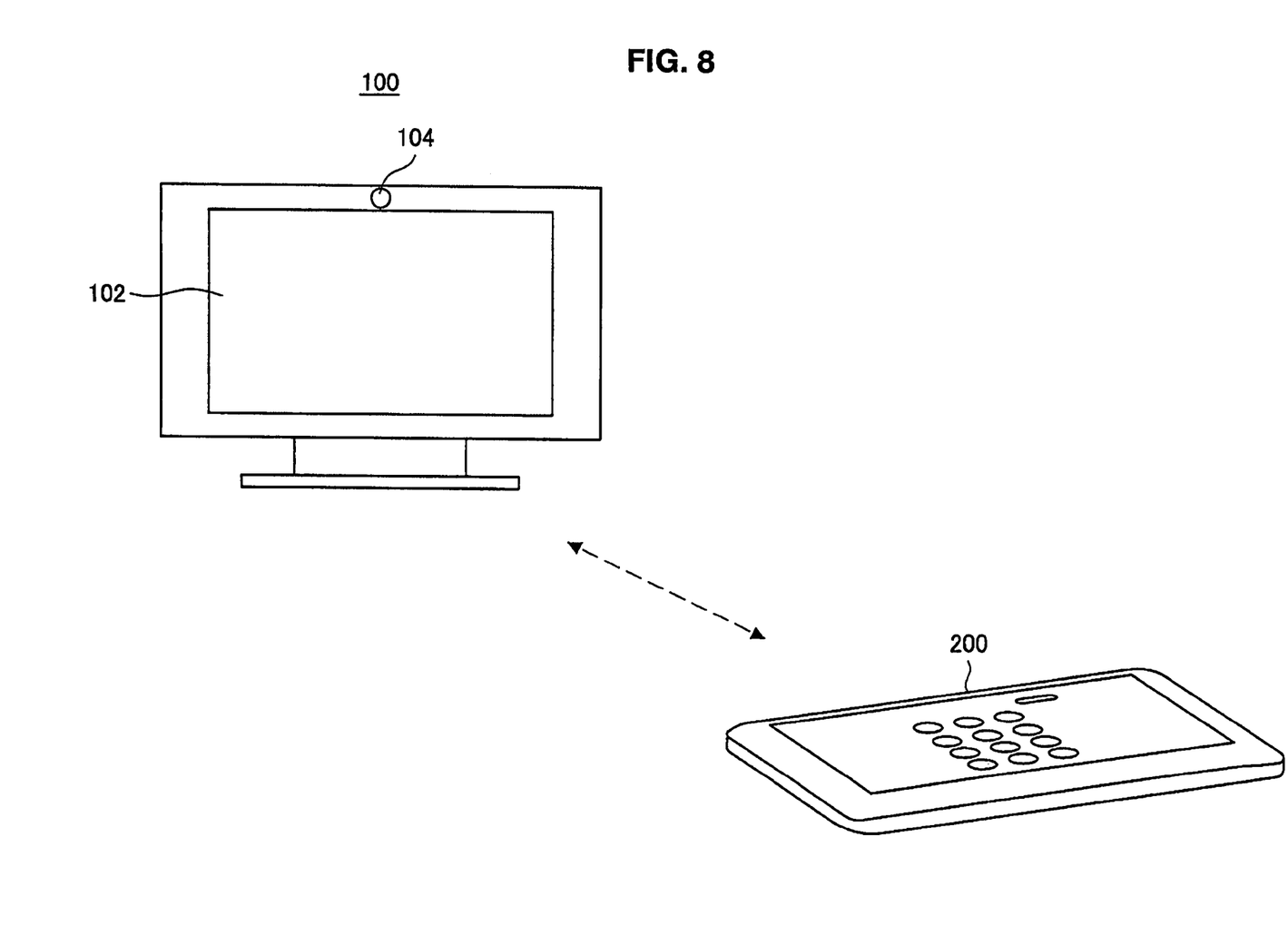
FIG. 8 is an explanatory view that shows a case where buttons displayed by a remote controller 200 are changed in correspondence to a recognised user.

FIG. 7 and FIG. 8 are explanatory views that show cases where buttons displayed by the remote controller 200 are changed in correspondence to recognised users. FIG. 7 shows a case where along with buttons for executing basic functions, such as channel selecting buttons and volume adjusting buttons, other buttons for execute various functions are also displayed on the remote controller 200. Examples of the other buttons for execute various functions may includes buttons for programmed recording of programmes, buttons for programmed showing of programmes, buttons for playing, fast-forwarding, fast-backwarding, stopping, and pausing a recorded programme, and buttons for switching airwaves. On the other hand, FIG. 8 shows a case where only buttons for executing basic functions, such as channel selecting buttons and volume adjusting buttons, are displayed on the remote controller 200. The displayed buttons for executing basic functions, such as channel selecting buttons and volume adjusting buttons, shown in FIG. 8 may be default buttons that is displayed when, as a result of the determination at step S115, the button information of the remote controller 200 for the successfully recognised user is not registered in the image display apparatus 100.

Thus, buttons displayed on the remote controller 200 can be changed by capturing an image by the image input unit 104, detecting and recognising a human's face in the captured image, and use a result of the recognition. Furthermore, when a user just simply sits in front of the image display apparatus 100, buttons corresponding to the user are displayed without any authentications of the user ID or any other ID numbers and of finger-prints or any other biometrics. Therefore, any complicated input operations are no longer necessary, nor are included any devices for biometric authentication in the remote controller 200.

Besides, if a plurality of human's faces are recognised by the face recognising unit 154, an infrared-ray signal may be emitted from the infrared-ray emitting unit 210 of the remote controller 200, the location of the infrared-ray emitting unit 210 of the remote controller 200 may be detected by the remote-controller detecting unit 156, and then button display of the remote controller 200 may be controlled by use of the detected location of the infrared-ray emitting unit 210. For example, if a plurality of human's faces are recognised by the face recognising unit 154, an infrared-ray signal may be emitted from the infrared-ray emitting unit 210 of the remote controller 200, and the location of the infrared-ray emitting unit 210 of the remote controller 200 may be detected by the remote-controller detecting unit 156. Then, a human whose face is the closest to the location of the remote controller 200 may be estimated as the user of the remote controller 200, so that button display of the remote controller 200 may be controlled. Besides, from the perspective of reducing power consumption, the operation for emitting an infrared-ray signal from the infrared-ray emitting unit 210 of the remote controller 200, and detecting the location of the infrared-ray emitting unit 210 of the remote controller 200 by the remote-controller detecting unit 154 is preferably limited to be performed only when a plurality of human's faces are recognised by the face recognising unit 154.

In the above, the operation of the image display apparatus 100 according to an embodiment of the present invention has been described by use of FIG. 6. Besides, the above-mentioned operation of the image display apparatus 100 according to an embodiment of the present invention may be performed by reading by the CPU 114 computer programs stored in the internal of the image display apparatus 100 (e.g., ROM or any other storage means, which is not shown), and sequentially executing them to control each part of the image display apparatus 100.

3. CONCLUSION

As described above, according to an embodiment of the present invention, the free cursor function or any other function can be realised in the remote controller 200, by capturing an image by the image input unit 104, and detecting, from the captured image, the face of the user who operates the remote controller 200 and the location of the infrared-ray emitting unit 210 of the remote controller 200. Furthermore, switching of the user interface picture displayed on the remote controller 200 can be controlled by the image display apparatus 100, by detecting and recognising, from the captured image, the face of the user who operates the remote controller 200.

It should be understood by those skilled in the art that various modifications, combinations, sub-combinations and alterations may occur depending on design requirements and other factors insofar as they are within the scope of the appended claims or the equivalents thereof.

For example, in the above-mentioned embodiment, the remote-controller detecting unit 156 detects the location of the remote controller 200 by detecting an infrared-ray signal emitted by the infrared-ray emitting unit 210 of the remote controller 200, though the present invention is not limited to the above example. For example, the remote controller 200 may emit visible light, and the visible light emitted by the remote controller 200 may be detected so that the location of the remote controller 200 may be detected.

Also for example, the shape of the remote controller 200 may be imaged by the image input unit 104 to be pre-recognised by the image display apparatus 100, so that the location of the remote controller 200 may be detected by use of information of the recognised shape of the remote controller 200. Also for example, if there is anything like a cradle to rest the remote controller 200 on, the location and shape of the cradle may be pre-recognised by the image display apparatus 100, so that the location of the remote controller 200 may be detected by use of information of the recognised location and shape of the cradle. Furthermore, the detecting unit 106 may detect, from the image captured by the image input unit 104, the location of the user's arm with the remote controller 200, so that the location of the remote controller 200 may be located.

Also for example, in the above-mentioned embodiment, the case has been described where the user's face is recognised by the face recognising unit 154, and where buttons displayed on the remote controller 200 are changed by use of a result of the face recognition, though except for buttons, pictures customised for the recognised user may be displayed on the remote controller 200. For example, the contents viewing status of the recognised user may be analysed by the CPU 114, and information related to the recommended contents the recognised user to view (for example, titles, airtime, playback time, casts, and any other information of the contents) may be displayed on the remote controller 200 and the display panel 102. Furthermore, if the remote controller 200 is capable for connecting to the Internet or any other external networks, pages on the Internet which correspond to the recognised user (for example, pages set as Homes by the recognised user and pages for online shopping, etc.) may be displayed on the remote controller 200 and the display panel 102.

Also for example, the face detecting unit 152 and the face recognising unit 154 may be configured not to consider a face included in an image transmitted from the image input unit 104 as human's, if the face stays at the same position for a predetermined time and won't move. By thus processing by the face detecting unit 152 and the face recognising unit 154, no figures in a poster and a photograph will not falsely detected and recognised.

What is clamed is:

1. An image display apparatus comprising:
    an image display unit for displaying a still image or a moving image;
    an imaging unit for capturing an image in a direction in which the image display unit is displaying the still image or the moving image;
    a detecting unit for detecting an infrared light emitting unit of a remote controlling device included in the image captured by the imaging unit, and detecting a movement amount of the light emitting unit within the captured image, the remote controlling device controlled by a user; and
    a control unit for controlling a movement amount of a pointer displayed on the image display unit, depending on the movement amount of the light emitting unit detected by the detecting unit,
    wherein the detecting unit detects a face of a viewer included in the image captured by the imaging unit and uses a result of the face detection to detect the light emitting unit, the detecting unit using the result of the face detection by specifying an area of the detected face and then applying a filtering such that the light emitting unit is detected only when the light emitting unit is within the area of the detected face.

2. The image display apparatus according to claim 1, wherein
    the detecting unit detects a face of a viewer included in the image captured by the imaging unit, and
    the control unit locates the pointer at a centre of the image display unit if the detecting unit detects that the light emitting unit is located at a position in a predetermined distance from the face detected by the detecting unit.

3. The image display apparatus according to claim 2, wherein the control unit controls an emitting period of the light emitting unit to be in integer multiples of a capturing period of the imaging unit.

4. The image display apparatus according to claim 1, wherein the control unit changes a light intensity of the light emitting unit if the detecting unit detects the light emitting unit.

5. The image display apparatus according to claim 1, wherein
    the detecting unit detects a face of a viewer included in the image captured by the imaging unit, and
    the control unit controls an operation of the remote controlling device by use of a detection result from the detecting unit.

6. The image display apparatus according to claim 5, wherein the control unit controls button display of the remote controlling device by use of the detection result from the detecting unit.

7. The image display apparatus according to claim 5, wherein the control unit estimates, by use of a detection result of the light emitting unit detected by the detecting unit, a person who operates the remote controlling device if the detecting unit detects a plurality of the faces of the viewers.

8. The image display apparatus according to claim 5, wherein the control unit instructs the light emitting unit to emit light if the detecting unit detects the face of the viewer.

9. The image display apparatus according to claim 1, wherein the control unit controls the movement amount of the pointer, depending on a distance between the user and the imaging unit.

10. A detecting method comprising the steps of:
capturing an image in a direction in which the image display unit that displays a still image or a moving image is displaying the still image or the moving image;
detecting an infrared light emitting unit of a remote controlling device included in the image captured at the step of capturing, and detecting a movement amount of the light emitting unit within the captured image, the remote controlling device controlled by a user; and
controlling a movement amount of a pointer displayed on the image display unit, depending on the movement amount of the light emitting unit detected at the step of detecting,
wherein the step of detecting comprises detecting a face of a viewer included in the captured image and using a result of the face detection to detect the light emitting unit, the detecting unit using the result of the face detection by specifying an area of the detected face and then applying a filtering such that the light emitting unit is detected only when the light emitting unit is within the area of the detected face.

* * * * *